No. 881,414. PATENTED MAR. 10, 1908.
E. M. KRAMER.
HARROW ATTACHMENT FOR PLOWS.
APPLICATION FILED JUNE 15, 1907.
2 SHEETS—SHEET 1.
Fig.1.
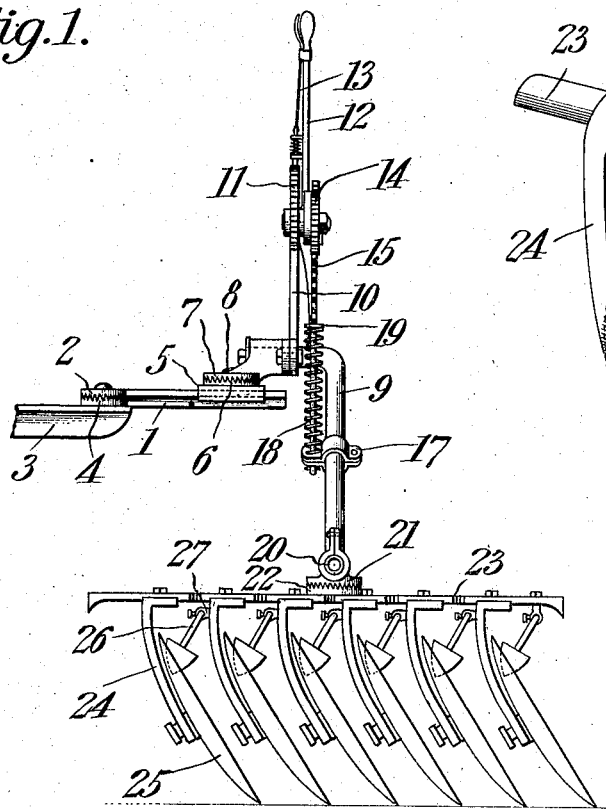
Fig.6.
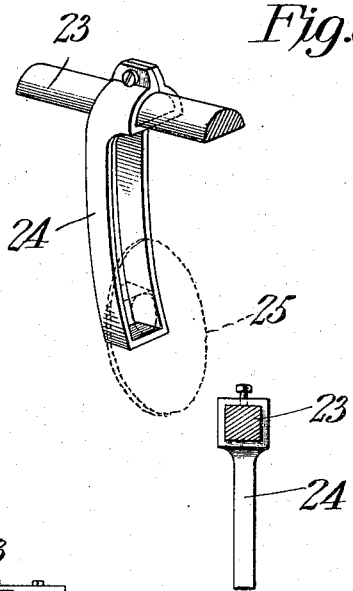
Fig.7.
Fig.4.
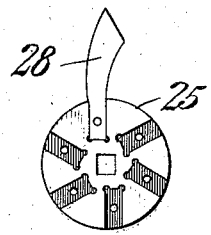
Fig.5.
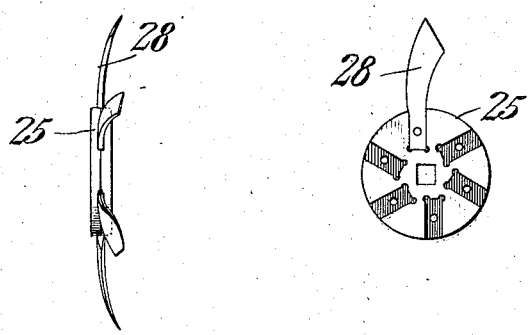
WITNESSES
Emil M Kramer INVENTOR
By C.A.Snow & Co.
ATTORNEYS No. 881,414. PATENTED MAR. 10, 1908.
E. M. KRAMER.
HARROW ATTACHMENT FOR PLOWS.
APPLICATION FILED JUNE 15, 1907.

2 SHEETS—SHEET 2.

WITNESSES: Emil M Kramer INVENTOR
By C. A. Snow & Co.
ATTORNEYS

UNITED STATES PATENT OFFICE.

EMIL M. KRAMER, OF PAXTON, ILLINOIS.

HARROW ATTACHMENT FOR PLOWS.

No. 881,414.

Specification of Letters Patent.

Patented March 10, 1908.

Application filed June 15, 1907. Serial No. 379,249.

*To all whom it may concern:*

Be it known that I, EMIL M. KRAMER, a citizen of the United States, residing at Paxton, in the county of Ford and State of Illinois, have invented a new and useful Harrow Attachment for Plows, of which the following is a specification.

This invention has relation to harrow attachments for plows and it consists in the novel construction and arrangement of its parts as hereinafter shown and described.

The object of the invention is to provide a plow attachment having rotary members adapted to engage the soil at the time that it is turned and pulverize the same before it has had sufficient time to harden and form into clods.

The attachment consists primarily of a frame adapted to be applied to the frame of a plow and which is provided with means for lateral adjustment with relation to the plow and pivot joints whereby the major portion of the attachment and the ground engaging elements thereof may be pitched at any desired angle with relation to the line of draft. The ground engaging elements are carried by a spring actuated arm, the tension of the spring of which holds the said element in contact with the ground, said arm being adapted to swing vertically. A lever mechanism is provided for swinging the arm and may also be manipulated to increase or diminish the tension of the spring as desired.

Figure 2:
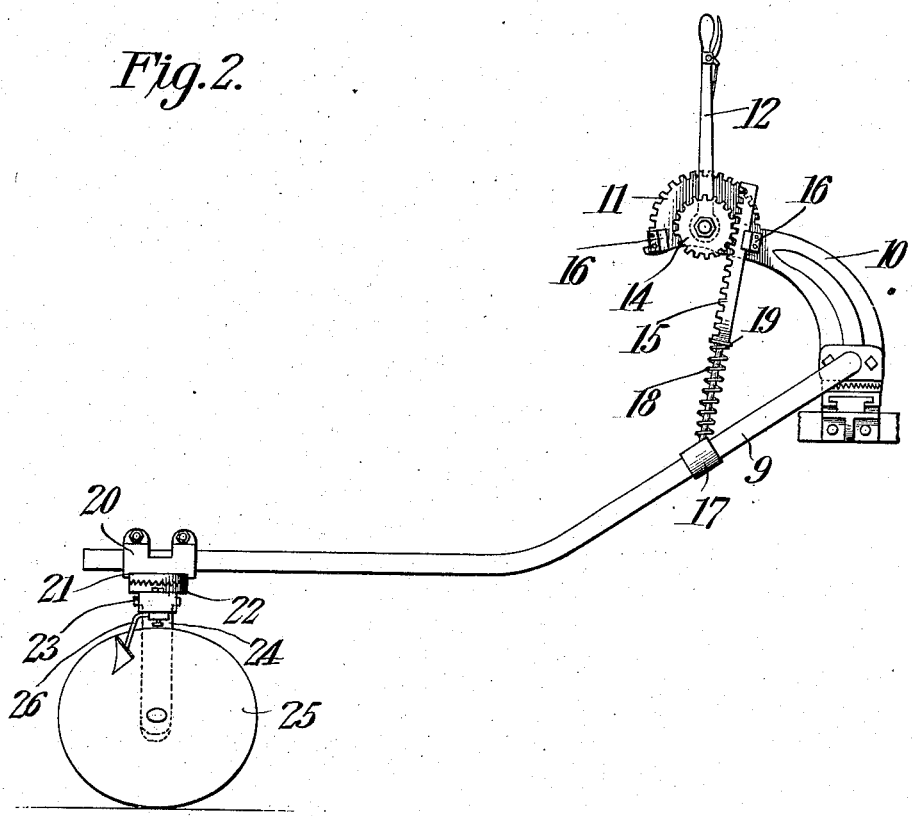
Figure 3:
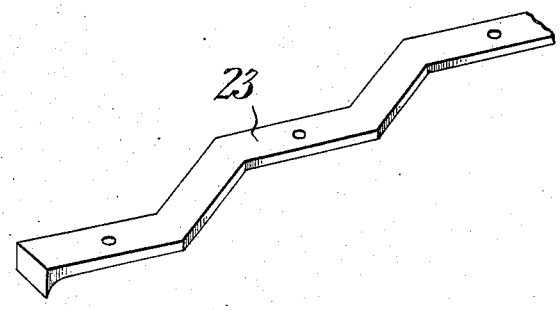

In the accompanying drawings:—Figure 1 is a rear elevation of the attachment. Fig. 2 is a side elevation of the same. Fig. 3 is a perspective view of a modified form of bar for carrying the earth engaging elements. Fig. 4 is an edge elevation of one form of earth engaging elements having a series of actinially disposed blades. Fig. 5 is a side elevation of the same, with parts removed. Fig. 6 is a perspective view of a modified form of standard used upon the attachment; and Fig. 7 is a side elevation of still another form of standard.

The attachment consists of the bracket 1 which is provided at one end with a circular portion 2 having a ridged under-face. The frame 3 of the plow is provided with a corresponding circular portion 4. The portions 2 and 4 bolted together but may be axially adjusted with relation to each other. The block 5 may slide longitudinally along the bracket 1 and may be secured by set screws at any desired point thereon. The said block is provided with a circular roughened portion 6 which is adapted to be engaged by a corresponding portion 7. The said parts 6 and 7 are bolted together and may be axially adjusted with relation to each other. The part 7 is provided with a bearing 8 and one end of the arm 9 is journaled in the said bearing. The standard 10 is mounted upon the bearing 8 and is provided at its upper end with a gear segment 11. The lever 12 is concentrically fulcrumed with relation to the segment 11 and is provided with a spring actuated pawl 13 which engages the ratchet teeth of the said segment. The gear wheel 14 is concentrically mounted upon the fulcrum of the lever 12 and meshes with the teeth of a bar 15. Said bar passes under a guide 16 attached to the side of a standard 10. The lower end of the said bar 15 passes through a clip 17 attached to the arm 9 and the coil spring 18 is interposed between the said plate and the pin 19 carried by the said bar 15. The clip 20 is adjustably attached to the lower portion of the arm 9 and is provided with a circular roughened portion 21.

The circular roughened block 22 is mounted upon the bar 23 and engages the roughened portion 21. The said portions 21 and 22 may be turned axially with relation to each other. As shown in Figs. 1 and 2, the bar 23 may be straight. Fig. 3 shows a modified form of the said bar in which form the bar is made up of a series of zigzag sections, the object of which arrangement will be hereinafter explained. The standards 24 depend from the bar 23 and the earth engaging elements 25 are journaled at the lower ends of the said standards. The said elements 25 may be in the form of disks, as shown in Figs. 1 and 2, or in the form of radial blades as shown in Figs. 4 and 5. In either instance the ground engaging elements are pitched at an angle to the surface of the ground as illustrated in Fig. 1. When the disks 25 are used the scrapers 26 are attached to the next adjacent standard 24 to that carrying the disk upon which they operate. The said scrapers are adjustably mounted in the eyes 27. The blades 28, shown in Figs. 4 and 5, are curved laterally, such curvature, however, may be toward either side as desired. When the bar 23, as shown in Fig. 3, is used the earth engaging elements are not alined with each other transversely with relation to the line of draft but are located slightly in advance of each other in order to more effectually operate upon the loose soil.

From the foregoing description it is obvious that an adjustable harrow-attachment is provided, the parts of which may be shifted laterally with relation to the plow and turned to any desired angle with relation to the line of draft. Also the earth engaging elements are held in contact with the ground under spring tension, which tension may be regulated to any desired degree, while the implement is in operation; also means is provided for lifting the earth engaging elements out of contact with the surface of the ground.

In the form of standard shown in Fig. 6, the same is provided with the parallel spaced lower side portions between which the bearing for the disk 25 may be adjustably secured while the upper portion of the standard is provided with a means for clamping upon the bar 23. Thus making it possible to adjust the standards 24 longitudinally of the bar 23 and thereby increase or diminish the space between the same as desired.

In the form of standard shown in Fig. 7 the standard may be adjusted upon the bar 23 and is then secured in place by means of a set screw.

Having described my invention what I claim as new and desire to secure by Letters-Patent is:—

1. A plow attachment comprising a bracket, a block slidably located on the bracket, a part adjustable on said block and having a bearing, an arm journaled in said bearing, a bar carried by said arm, earth engaging elements carried by said bar, a standard attached to the said part, a lever fulcrumed on the standard, a gear wheel attached to the lever, a gear rod meshing with said gear wheel and slidably connecting with the arm and a coil spring interposed between the gear rod and the arm.

2. A plow attachment comprising a standard, a swinging arm, a lever fulcrumed to the standard, a gear wheel attached to said lever, a gear bar meshing with said gear wheel and slidably engaging said arm, a spring interposed between the arm and the gear bar, a zigzag bar attached to said arm, and ground engaging elements carried by the last said bar.

3. A plow attachment comprising a standard, a swinging arm, a lever fulcrumed to the standard, a gear wheel attached to said lever, a gear bar meshing with said gear wheel and slidably engaging said arm, a spring interposed between said gear bar and said arm, a collar adjustably carried by said arm, a bar adjustably attached to said collar, and earth engaging elements carried by said bar.

In testimony that I claim the foregoing as my own, I have hereto affixed my signature in the presence of two witnesses.

EMIL M. KRAMER.

Witnesses:
AMANDA V. ROZEUR,
JOHN W. KAUFMANN.